(12) United States Patent
Yun (10) Patent No.: US 10,996,527 B2
(45) Date of Patent: May 4, 2021

(54) LIQUID CRYSTAL DISPLAY

(71) Applicant: Samsung Display Co., Ltd., Yongin-si (KR)

(72) Inventor: Hui Gyeong Yun, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/446,345

(22) Filed: Jun. 19, 2019

(65) Prior Publication Data

US 2020/0124931 A1  Apr. 23, 2020

(30) Foreign Application Priority Data

Oct. 17, 2018  (KR) .................. 10-2018-0123910

(51) Int. Cl.
  *G02F 1/1362*  (2006.01)
  *G02F 1/1368*  (2006.01)
  *G02F 1/1333*  (2006.01)
  *G02F 1/1343*  (2006.01)

(52) U.S. Cl.
  CPC ...... *G02F 1/136286* (2013.01); *G02F 1/1368* (2013.01); *G02F 1/133345* (2013.01); *G02F 1/134309* (2013.01); *G02F 2001/134345* (2013.01); *G02F 2001/136222* (2013.01); *G02F 2201/123* (2013.01)

(58) Field of Classification Search
  None
  See application file for complete search history.

(56) References Cited

U.S. PATENT DOCUMENTS

| | | | |
|---|---|---|---|
| 2012/0320019 A1* | 12/2012 | Jeong | G09G 3/3648 345/211 |
| 2013/0242239 A1* | 9/2013 | Chang | G02F 1/133707 349/106 |
| 2014/0043571 A1* | 2/2014 | Chang | G02F 1/139 349/123 |

(Continued)

FOREIGN PATENT DOCUMENTS

| KR | 10-2012-0139451 A | 12/2012 |
|---|---|---|
| KR | 10-2015-0058609 A | 5/2015 |

(Continued)

*Primary Examiner* — Ryan Crockett
(74) *Attorney, Agent, or Firm* — Lewis Roca Rothgerber Christie LLP (57) ABSTRACT

A liquid crystal display includes: a first substrate; a gate line and a reference electrode that are disposed on the first substrate and are spaced apart from each other; a gate insulating film disposed on the gate line and the reference electrode; a semiconductor disposed on the gate insulating film; a data conductor disposed on the semiconductor; a passivation film disposed on the data conductor; a color filter disposed on the passivation film; an overcoat disposed on the color filter; and a pixel electrode and a reference voltage line that are disposed on the overcoat and are spaced apart from each other, wherein the pixel electrode and the reference voltage line may include the same material, and the reference voltage line may be connected to the reference electrode through a reference voltage contact hole disposed in the gate insulating film, the passivation film, the color filter, and the overcoat.

20 Claims, 5 Drawing Sheets

(56) References Cited

U.S. PATENT DOCUMENTS

| | | | | |
|---|---|---|---|---|
| 2015/0138479 A1* | 5/2015 | Lee | ............... | G02F 1/1341 |
| | | | | 349/44 |
| 2016/0131945 A1* | 5/2016 | Woo | ............... | G02F 1/1368 |
| | | | | 349/43 |
| 2017/0047037 A1* | 2/2017 | Kim | ............... | G09G 3/3688 |
| 2017/0069244 A1* | 3/2017 | Lim | ............... | G09G 3/3607 |
| 2020/0117062 A1* | 4/2020 | Kim | ............ | G02F 1/136286 |

FOREIGN PATENT DOCUMENTS

| | | |
|---|---|---|
| KR | 10-2017-0020673 A | 2/2017 |
| KR | 10-2017-0030720 A | 3/2017 |

\* cited by examiner

LIQUID CRYSTAL DISPLAY

CROSS-REFERENCE TO RELATED APPLICATION

This application claims priority to and the benefit of Korean Patent Application No. 10-2018-0123910, filed in the Korean Intellectual Property Office on Oct. 17, 2018, the entire content of which is incorporated herein by reference.

BACKGROUND

1. Field

The present disclosure relates to a liquid crystal display.

2. Description of the Related Art

A liquid crystal display, as one of flat panel display devices that are being widely used, includes two display panels, wherein field generating electrodes such as a pixel electrode and a common electrode are formed with a liquid crystal layer interposed therebetween.

The liquid crystal display generates an electric field in a liquid crystal layer by applying a voltage to the field generating electrodes to determine orientations of liquid crystal molecules of the liquid crystal layer and control polarization of incident light, thereby displaying an image.

Among the liquid crystal displays, a vertically aligned mode liquid crystal display, in which liquid crystal molecules are aligned so that long axes thereof are normal or perpendicular to the upper and lower panels when no electric field is applied, has been in the limelight because its contrast ratio is high and because a wide reference viewing angle can be easily implemented.

The liquid crystal display in the vertically aligned mode may have degraded side visibility compared to front visibility. To solve this problem, a driving method of dividing one pixel into two sub-pixels and differently adjusting voltages of the two sub-pixels has been proposed.

The above information disclosed in this Background section is only for enhancement of understanding of the background of the invention, and therefore it may contain information that does not form the prior art that is already known to a person of ordinary skill in the art.

SUMMARY

Aspects of embodiments of the present invention are directed toward a liquid crystal display that may reduce or prevent horizontal crosstalk defects of the liquid crystal display.

An exemplary embodiment of the present invention provides a liquid crystal display including: a first substrate; a gate line and a reference electrode that are disposed on the first substrate and are spaced apart from each other; a gate insulating film disposed on the gate line and the reference electrode; a semiconductor disposed on the gate insulating film; a data conductor disposed on the semiconductor; a passivation film disposed on the data conductor; a color filter disposed on the passivation film; an overcoat disposed on the color filter; and a pixel electrode and a reference voltage line that are disposed on the overcoat and are spaced apart from each other, wherein the pixel electrode and the reference voltage line may be composed of (e.g., formed of or include) the same material, and the reference voltage line may be connected to the reference electrode through a reference voltage contact hole disposed in the gate insulating film, the passivation film, the color filter, and the overcoat.

The gate line may include a first gate electrode, a second gate electrode, and a third gate electrode; the semiconductor may include a linear semiconductor, a first channel portion, a second channel portion, and a third channel portion; the data conductor may include a data line, a first source electrode, a second source electrode, a third source electrode, a first drain electrode, a second drain electrode, and a third drain electrode; and the pixel electrode may include a first sub-pixel electrode and a second sub-pixel electrode that are spaced apart from each other.

The first channel portion may overlap the first gate electrode, the second channel portion may overlap the second gate electrode, and the third channel portion may overlap the third gate electrode.

The data line may be disposed on the linear semiconductor, the first source electrode and the first drain electrode may be disposed on the first channel portion and face each other based on the first gate electrode, the second source electrode and the second drain eectrode may be disposed on the second channel portion and face each other based on the second gate electrode, and the third source electrode and the third drain electrode may be disposed on the third channel portion and face each other based on the third gate electrode.

The first source electrode and the second source electrode may be connected to each other, and the third source electrode and the second drain electrode may be connected to each other.

The first source electrode and the second source electrode may extend from the data line.

The first sub-pixel electrode may be connected to the first drain electrode through a first contact hole disposed in the passivation film, the color filter, and the overcoat; and the second sub-pixel electrode may be connected to the second drain electrode through a second contact hole disposed in the passivation film, the color filter, and the overcoat.

The reference voltage line may be disposed between the first sub-pixel electrode and the second sub-pixel electrode in a plan view.

The reference voltage line may include a connecting member connected to the reference electrode through the reference voltage contact hole.

The connecting member may be connected to the third drain electrode through the reference voltage contact hole.

The reference electrode may include a first reference electrode, a second reference electrode, a third reference electrode, a fourth reference electrode, a fifth reference electrode, and a reference electrode contact portion; the first reference electrode, the second reference electrode, and the third reference electrode may surround the first sub-pixel electrode in a plan view; the fourth reference electrode and the fifth reference electrode may surround the second sub-pixel electrode in a plan view; and the reference electrode contact portion may extend from the first reference electrode.

The connecting member may be connected to the reference electrode contact portion through the reference voltage contact hole.

Another exemplary embodiment of the present invention provides a liquid crystal display including: a first substrate; a gate line and a data line that are disposed on the first substrate and are insulated from each other; a first transistor and a second transistor that are connected to the gate line and the data line; a third transistor connected to a drain electrode of the second transistor; an insulating film disposed on the first transistor, the second transistor, and the third transistor;

and a pixel electrode and a reference voltage line that are disposed on the insulating film and are spaced apart from each other, wherein the pixel electrode and the reference voltage line may be composed of the same material, and the reference voltage line may be connected to a drain electrode of the third transistor.

The pixel electrode may include a first sub-pixel electrode and a second sub-pixel electrode that are spaced apart from each other.

The first sub-pixel electrode may be connected to a drain electrode of the first transistor, and the second sub-pixel electrode may be connected to a drain electrode of the second transistor.

The reference voltage line may include a connecting member connected to the drain electrode of the third transistor.

The liquid crystal display may further include a reference electrode that is disposed on the same layer as the gate line, is separated from the gate line, and is connected to the connecting member.

The connecting member may be connected to the reference electrode contact portion.

According to the embodiments, it is possible to reduce or prevent horizontal crosstalk defects of the liquid crystal display.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

Parts that are not relevant to the description will not be provided to more clearly describe the present disclosure, and like reference numerals designate like elements throughout the specification.

Further, in the drawings, the size and thickness of each element are arbitrarily illustrated for ease of description, and the present disclosure is not necessarily limited to those elements illustrated in the drawings. In the drawings, the thicknesses of layers, films, panels, regions, etc., are exaggerated for clarity. In the drawings, for ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" refers to being positioned on or below the object portion, and does not necessarily refer to being positioned on the upper side of the object portion based on a gravitational direction.

In addition, unless explicitly described to the contrary, the word(s) "composed of", "include", or "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

Figure 1:
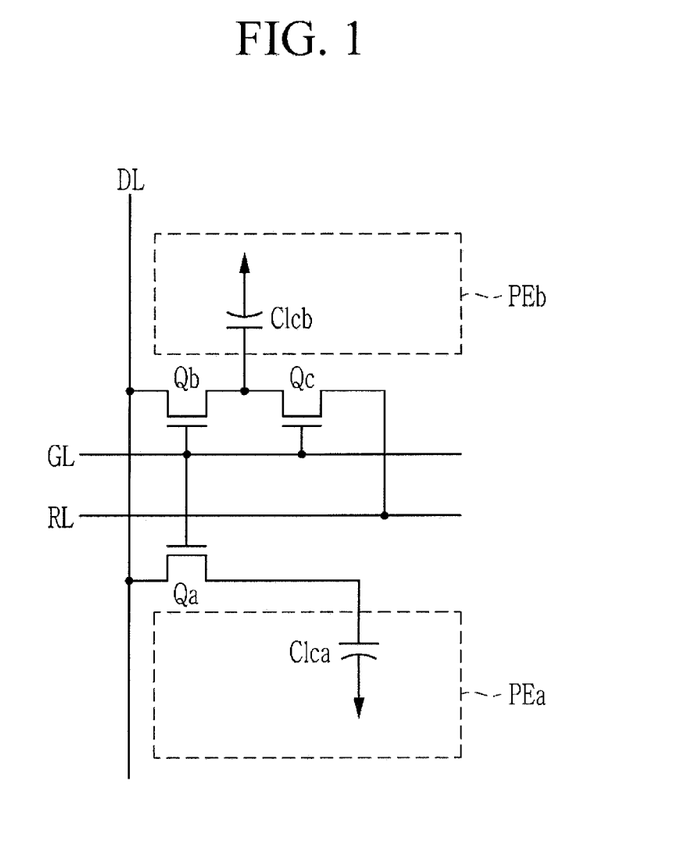
FIG. 1 illustrates an equivalent circuit diagram of a pixel of a liquid crystal display according to an embodiment of the present invention.

FIG. 1 illustrates an equivalent circuit diagram of a pixel of a liquid crystal display according to an embodiment of the present invention.

Referring to FIG. 1, the pixel of the liquid crystal display according to the present embodiment includes a first switching element Qa, a second switching element Qb, a third switching element Qc, a first liquid crystal capacitor Clca, a second liquid crystal capacitor Clcb, a first sub-pixel electrode PEa, and a second sub-pixel electrode PEb.

The first and second switching elements Qa and Qb are respectively connected to a gate line GL and a data line DL, and the third switching element Qc is connected to an output terminal of the second switching element Qb and a reference voltage line RL.

Here, the gate line GL provides a gate signal, the data line DL provides a data signal, and the reference voltage line RL provides a divided reference voltage.

The first switching element Qa and the second switching element Qb are three-terminal elements such as transistors, and their control terminals are connected to the gate line GL, while their input terminals are connected to the data line DL. An output terminal of the first switching element Qa is connected to the first liquid crystal capacitor Clca, and an output terminal of the second switching device Qb is connected to the second liquid crystal capacitor Clcb and an input terminal of the third switching element Qc.

The third switching element Qc is also a three-terminal element such as a transistor, and a control terminal thereof is connected to the gate line GL, an input terminal thereof is connected to the second liquid crystal capacitor Clcb, and an output terminal thereof is connected to the reference voltage line RL.

When a gate-on signal is applied to the gate line GL, the first switching element Qa, the second switching element Qb, and the third switching element Qc connected to the gate line GL are turned on. Thus, a data voltage applied to the data line DL is applied to the first sub-pixel electrode PEa and the second sub-pixel electrode PEb through the turned-on first switching element Qa and the turned-on second switching element Qb. In this case, the data voltages applied to the first sub-pixel electrode PEa and the second sub-pixel electrode PEb are the same, and the first and second liquid crystal capacitors Clca and Clcb are charged (provided) with the same value as a difference between a common voltage and the data voltage.

Simultaneously, a voltage charged to the second liquid crystal capacitor Clcb is divided by the turned-on third switching element Qc. Thus, the voltage charged to the second liquid crystal capacitor Clcb is decreased by a difference between the common voltage and the divided reference voltage. That is, a voltage charged to the first liquid crystal capacitor Clca is higher than a voltage charged to the second liquid crystal capacitor Clcb.

In other words, the voltages charged to the first and second liquid crystal capacitors Clca and Clcb are different from each other. One pixel of the liquid crystal display according to the present embodiment may be divided into a first sub-pixel in which the first sub-pixel electrode PEa is disposed and a second sub-pixel in which the second sub-pixel electrode PEb is disposed, and because the voltages of the first and second liquid crystal capacitors Clca and Clcb are different from each other, tilt angles of liquid crystal molecules of the first and second sub-pixel electrodes are different, and thus the luminance of the two sub-pixels are different from each other. Accordingly, when the voltages of the first and second liquid crystal capacitors Clca and Clcb are appropriately adjusted, an image viewed from a front side should be as close as possible to an image viewed from a lateral side, thereby improving side visibility.

In the shown embodiment, the third switching element Qc connected to the second liquid crystal capacitor Clcb and the reference voltage line RL is included to make the voltages charged to the first and second liquid crystal capacitors Clca and Clcb different, but the second liquid crystal capacitor Clcb may be connected to a step-down capacitor in the case of a liquid crystal display according to another embodiment of the present invention. Specifically, the third switching element Qc including a first terminal connected to the step-down capacitor, a second terminal connected to the second liquid crystal capacitor Clcb, and a third terminal connected to the step-down capacitor may be included such that an amount of charges charged in the second liquid crystal capacitor Clcb may be partially charged in the step-down capacitor, thereby differently setting the charged voltages between the first and second liquid crystal capacitors Clca and Clcb.

Alternatively, using various different methods, the charged voltages between the first and second liquid crystal capacitors Clca and Clcb may be differently set.

A structure of the liquid crystal display according to the embodiment shown in FIG. 1 will now be described with reference to FIG. 2 to FIG. 5.

Figure 2:
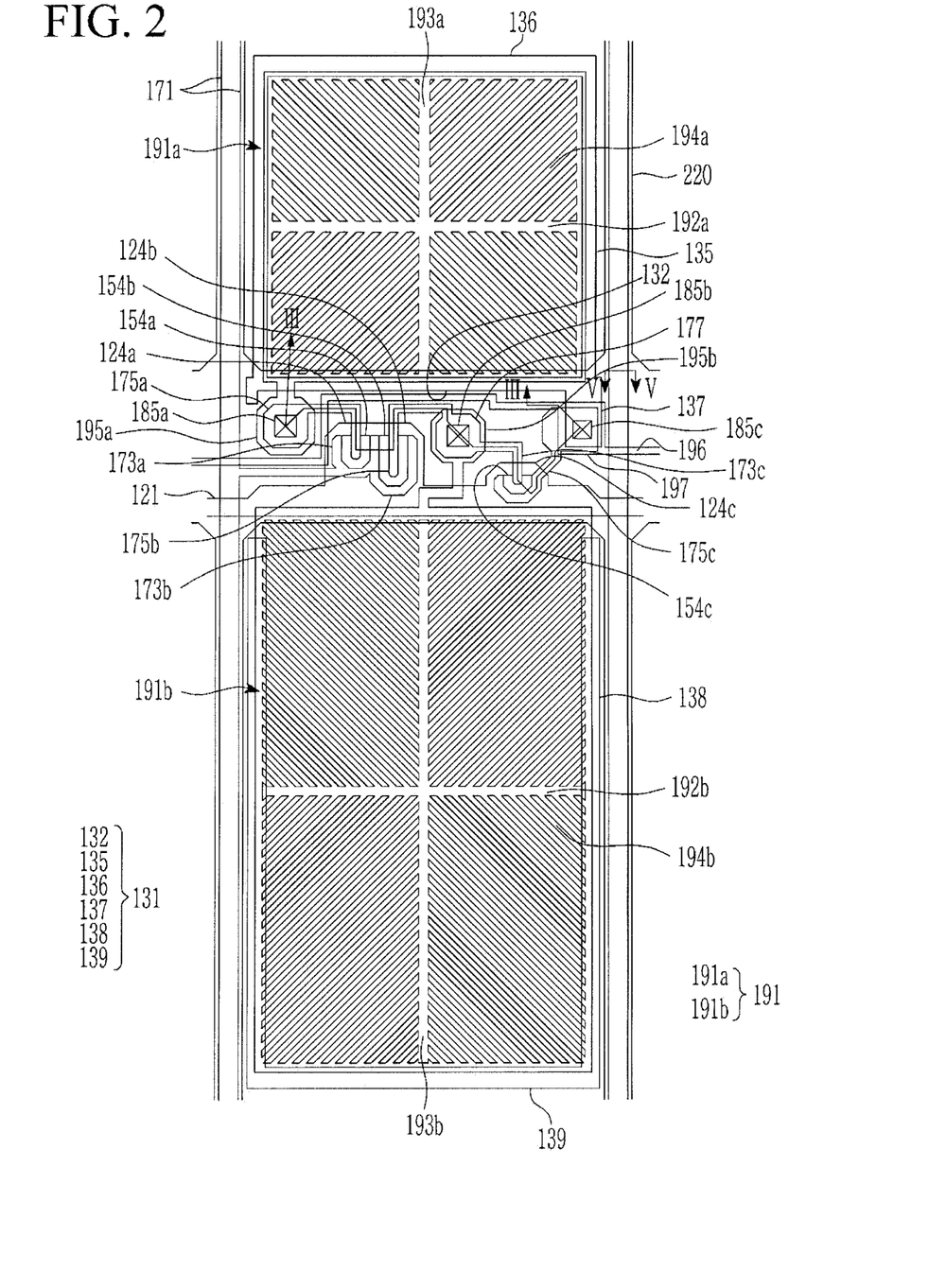
FIG. 2 illustrates a layout diagram of a pixel of the liquid crystal display shown in FIG. 1.
Figure 3:
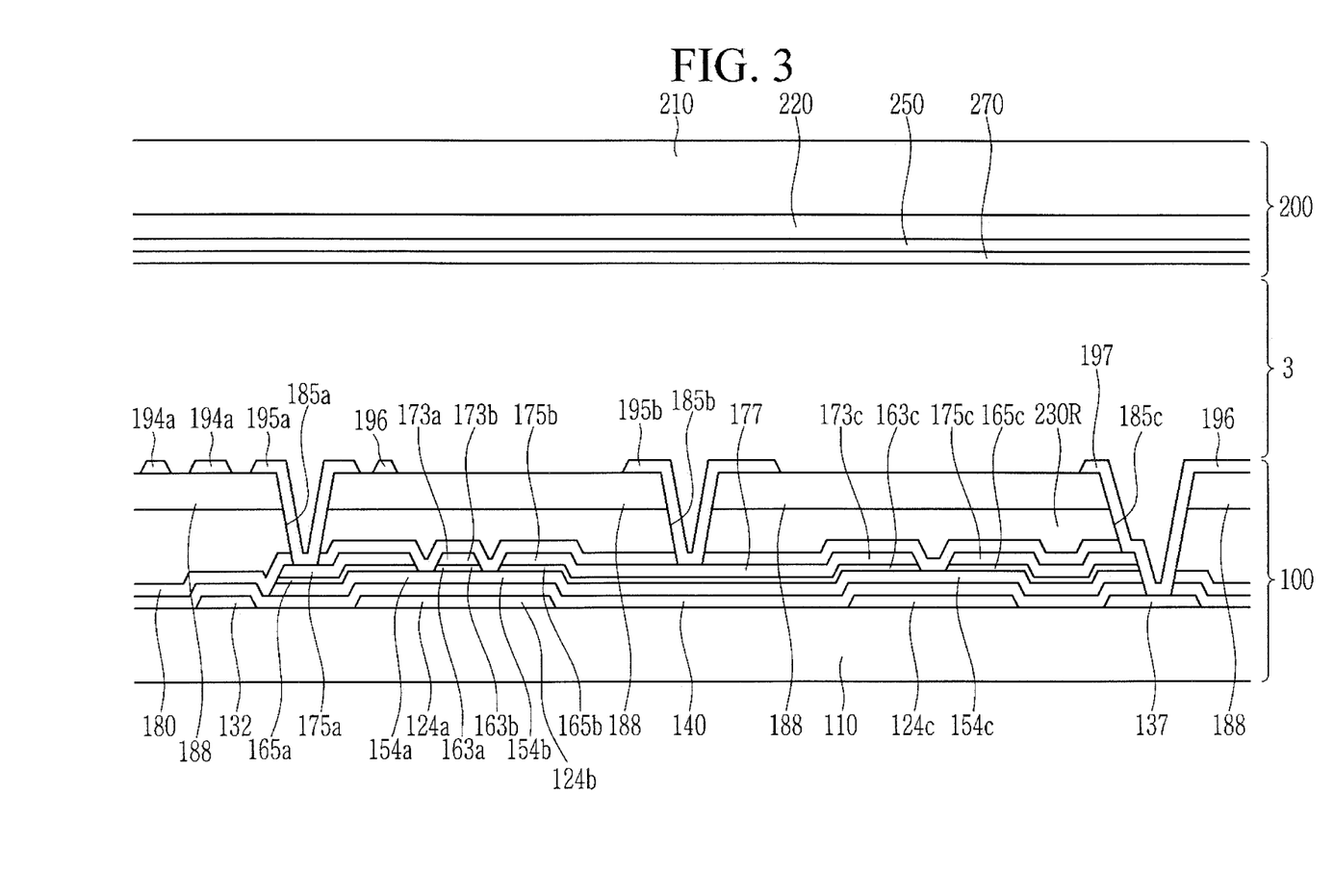
FIG. 3 illustrates a cross-sectional view taken along line III-Ill of FIG. 2.
Figure 4:
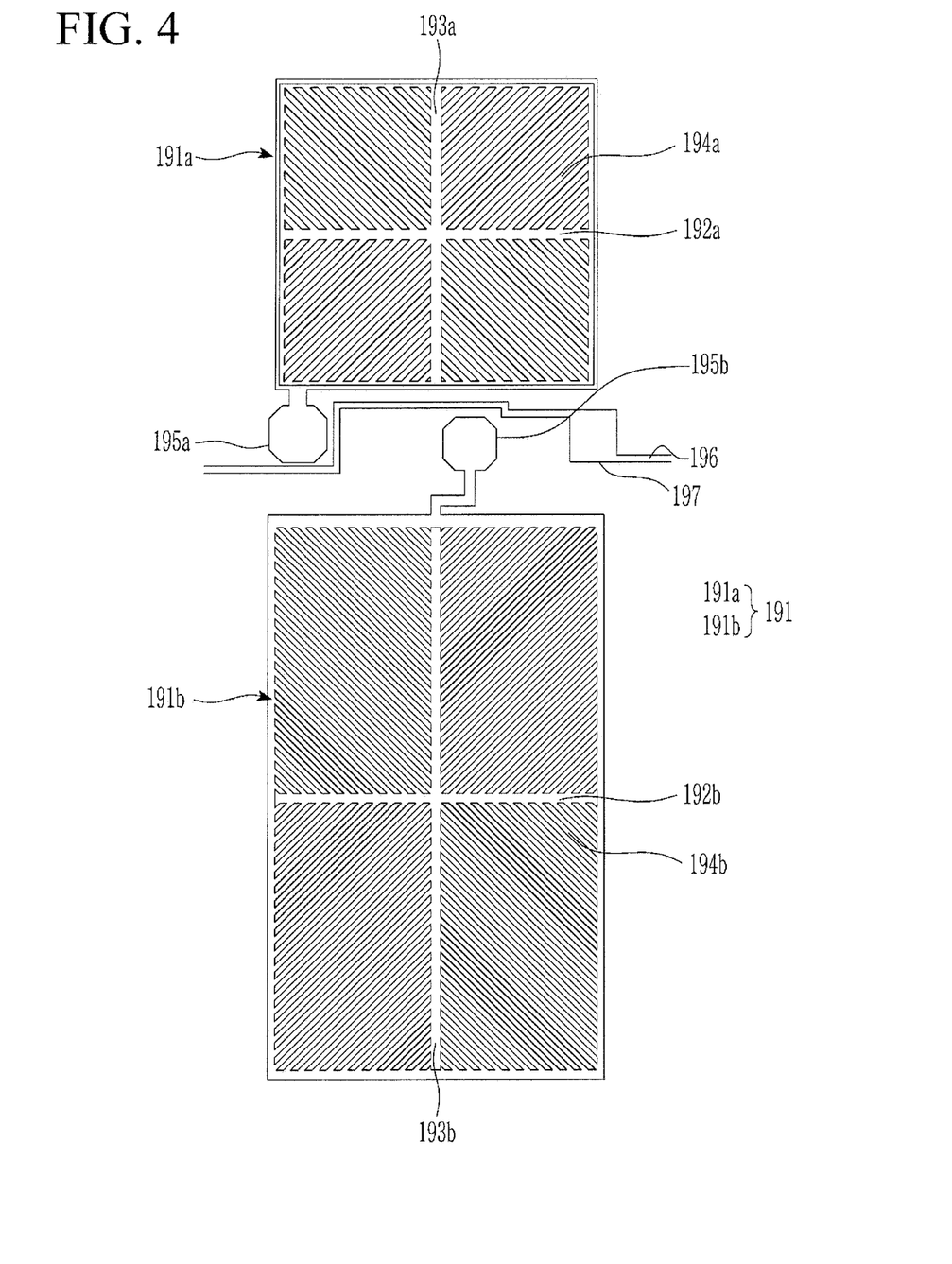
FIG. 4 illustrates a layout of a pixel electrode and a reference voltage line in the layout diagram of FIG. 2.
Figure 5:
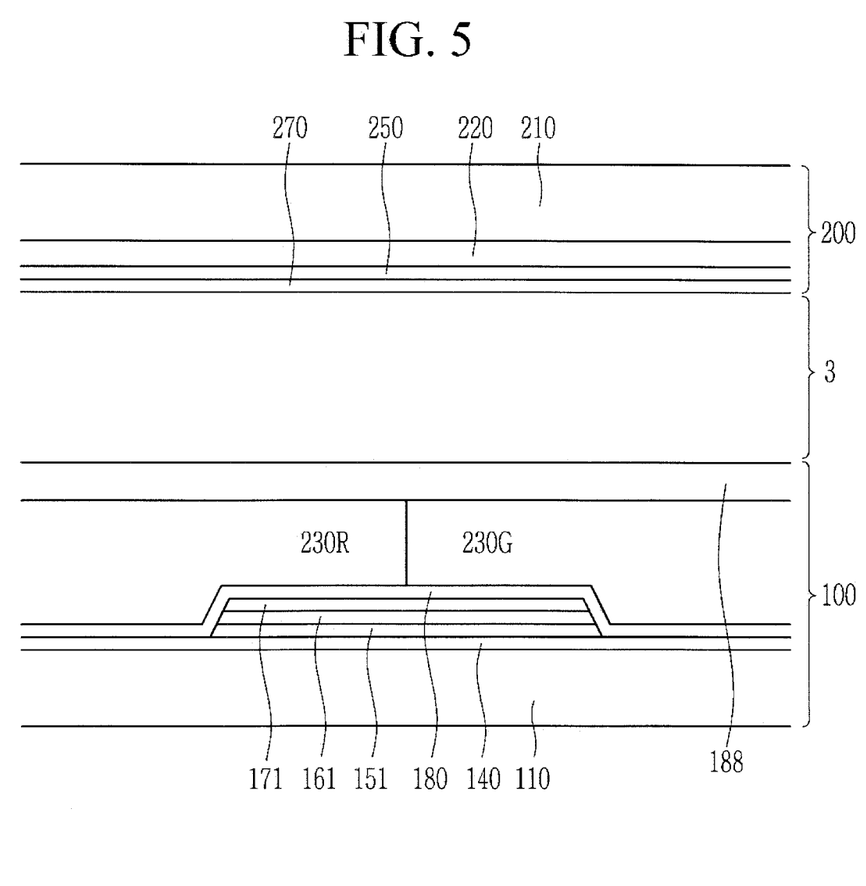
FIG. 5 illustrates a cross-sectional view taken along line V-V of FIG. 2.

FIG. 2 illustrates a layout diagram of a pixel of the liquid crystal display shown in FIG. 1. FIG. 3 illustrates a cross-sectional view taken along line of FIG. 2. FIG. 4 illustrates a layout of a pixel electrode and a reference voltage line in the layout diagram of FIG. 2. FIG. 5 illustrates a cross-sectional view taken along line V-V of FIG. 2.

Referring to FIG. 2 to FIG. 5, the liquid crystal display according to the present embodiment includes a first display panel 100, a second display panel 200, and a liquid crystal layer 3 interposed between the first and second display panels 100 and 200.

Hereinafter, the first display panel 100 will be described.

A gate line 121 and the reference electrode 131 are disposed on a first substrate 110. The first substrate 110 includes an insulating material (such as transparent glass and/or plastic).

The gate line 121 mainly extends in a horizontal direction to provide a gate signal, and includes a first gate electrode 124a, a second gate electrode 124b, and a third gate electrode 124c. In addition, the gate line 121 includes a wide end portion for connection with other layers or an external driving circuit.

The reference electrode 131 is spaced apart from the gate line 121 and receives a set or predetermined voltage such as a reference voltage. The reference electrode 131 includes a first reference electrode 132, a second reference electrode 135, a third reference electrode 136, a fourth reference electrode 138, a fifth reference electrode 139, and a reference electrode contact portion 137. The first reference electrode 132 and the third reference electrode 136 are spaced apart from each other in a vertical (or a first) direction and extend in a horizontal (or a second) direction, and the second reference electrode 135 extends in the vertical direction and connects the first reference electrode 132 and the third reference electrode 136. In a plan view, the first reference electrode 132, the second reference electrode 135, and the third reference electrode 136 surround a first sub-pixel electrode 191a, which will be described later in more detail. The reference electrode contact portion 137 extends from the first reference electrode 132. In a plan view, the fourth reference electrode 138 and the fifth reference electrode 139 surround a second sub-pixel electrode 191b, which will be described later in more detail. In one embodiment, the third reference electrode 136 may be connected to the fifth reference electrode 139 of the previous pixel by an integrated wire.

A gate insulating film (e.g., gate insulating layer) 140 is disposed on the gate line 121 and the reference electrode 131, and semiconductors 151, 154a, 154b, and 154c are disposed on the gate insulating film 140.

The semiconductors 151, 154a, 154b, and 154c include a linear semiconductor 151, a first channel portion 154a, a second channel portion 154b, and a third channel portion 154c. The first channel portion 154a overlaps the first gate electrode 124a, the second channel portion 154b overlaps the second gate electrode 124b, and the third channel portion 154c overlaps the third gate electrode 124c. The linear semiconductor 151, the first channel portion 154a, the second channel portion 154b, and the third channel portion 154c may include (or be composed of) amorphous silicon, polycrystalline silicon, or an oxide semiconductor.

An ohmic contact layer 161, first ohmic contact members 163a and 165a, second ohmic contact members 163b and 165b, and third ohmic contact members 163c and 165c are disposed on the semiconductors 151, 154a, 154b, and 154c. The first ohmic contact members 163a and 165a include a first source ohmic contact member 163a and a first drain ohmic contact member 165a that are spaced apart from each other. The second ohmic contact members 163b and 165b include a second source ohmic contact member 163b and a second drain ohmic contact member 165b that are spaced apart from each other. The third ohmic contact members 163c and 165c include a third source ohmic contact member 163c and a third drain ohmic contact member 165c that are spaced apart from each other.

Specifically, the ohmic contact layer 161 is disposed on the linear semiconductor 151, and the first ohmic contact members 163a and 165a are disposed on the first channel portion 154a. The second ohmic contact members 163b and 165b are disposed on the second channel portion 154b, and the third ohmic contact members 163c and 165c are disposed on the third channel portion 154c.

The ohmic contact layer 161, the first ohmic contact members 163a and 165a, the second ohmic contact members 163b and 165b, and the third ohmic contact members 163c and 165c may include (or be composed of) silicide or n+ hydrogenated amorphous silicon in which n-type impurities are doped at a high concentration. When the linear semiconductor 151, the first channel portion 154a, the second channel portion 154b, and the third channel portion 154c are made of an oxide semiconductor, the ohmic contact layer 161, the first ohmic contact members 163a and 165a, the second ohmic contact member 163b and 165b, and the third ohmic contact members 163c and 165c may be omitted.

Data conductors 171, 173a, 173b, 173c, 175a, 175b, and 175c are disposed on the ohmic contact layer 161, the first ohmic contact members 163a and 165a, the second ohmic contact members 163b and 165b, and the third ohmic contact members 163c and 165c. The data conductors 171, 173a, 173b, 173c, 175a, 175b, and 175c include a data line 171, a first source electrode 173a, a second source electrode 173b, a third source electrode 173c, a first drain electrode 175a, a second drain electrode 175b, and a third drain electrode 175c.

The data line 171 provides a data signal, mainly extends in the horizontal direction, crosses the gate line 121, and does not overlap the reference electrode 131. The data line 171 is disposed on the ohmic contact layer 161. The first source electrode 173a and the first drain electrode 175a are disposed on the first source ohmic contact member 163a and the first drain ohmic contact member 165a, respectively, and face each other based on the first gate electrode 124a. The second source electrode 173b and the second drain electrode 175b are disposed on the second source ohmic contact member 163b and the second drain ohmic contact member 165b, respectively, and face each other based on the second gate electrode 124b. The third source electrode 173c and the third drain electrode 175c are disposed on the third source ohmic contact member 163c and the third drain ohmic contact member 165c, respectively, and face each other based on the third gate electrode 124c.

The first source electrode 173a and the second source electrode 173b are connected to each other, and extend from the data line 171. The second drain electrode 175b is connected to the third source electrode 173c, and includes a widened extension 177. However, the present invention is not limited thereto, and the shapes of the data line 171 and the first, second, and third drain electrodes 175a, 175b, and 175c and arrangement thereof may be modified into various forms. In addition, the data line 171 may include a wide end portion for connection with other layers or an external driving circuit.

The first gate electrode 124a, the first source electrode 173a, and the first drain electrode 175a form a first transistor Qa together with the first channel portion 154a, and a channel of the first transistor Qa is formed in the first channel portion 154a between the first source electrode 173a and the first drain electrode 175a. Similarly, the second gate electrode 124b, the second source electrode 173b, and the second drain electrode 175b form a second transistor Qb together with the second channel portion 154b, and a channel of the second transistor Qb is formed in the second channel portion 154b between the second source electrode 173b and the second drain electrode 175b. The third gate electrode 124c, the third source electrode 173c, and the third drain electrode 175c form a third transistor Qc together with the third channel portion 154c, and a channel of the third transistor Qc is formed in the third channel portion 154c between the third source electrode 173c and the third drain electrode 175c.

A passivation film (e.g., passivation layer) 180 is disposed on the data conductors 171, 173a, 173b, 173c, 175a, 175b, and 175c and on the exposed first, second, and third channel portions 154a, 154b, and 154c. The passivation film 180 may be formed of an inorganic insulating material such as a silicon nitride or a silicon oxide. The passivation film 180 may block or prevent a pigment of a red color filter 230R, which will be described later in more detail, from flowing into the exposed first, second, and third channel portions 154a, 154b, and 154c.

The red color filter 230R is disposed on the passivation film 180. The red color filter 230R may extend in the vertical direction along two data lines 171 adjacent to each other.

The liquid crystal display according to the present embodiment includes a color filter that displays one of primary colors such as one of three primary colors of red, green, and blue. The pixel of the liquid crystal display according to FIG. 2 includes the red color filter 230R. In addition, a pixel adjacent to the pixel of the liquid crystal display according to FIG. 2 may include a green color filter 230G (see FIG. 5).

However, the color filter of the liquid crystal display according to the present embodiment is not limited to the three primary colors of red, green, and blue, and may display any one of colors of cyan, magenta, yellow, and white-based colors.

An overcoat 188 is disposed on the red color filter 230R. The overcoat 188 may include an inorganic insulating material such as a silicon nitride and/or a silicon oxide. The overcoat 188 protects or prevents the red color filter 230R from being lifted and suppresses the liquid crystal layer 3 from being polluted due to an organic material, such as a solvent inflowing from the red color filter 230R, thereby reducing or preventing defects, such as an afterimage which may occur at the time of driving the screen, from occurring.

A first contact hole 185a and a second contact hole 185b that overlap the first drain electrode 175a and the second drain electrode 175b, respectively, are disposed in the passivation film 180, the red color filter 230R, and the overcoat 188. A reference voltage contact hole 185c that partially overlaps the reference electrode contact portion 137 and the third drain electrode 175c is disposed in the gate insulating film 140, the passivation film 180, the red color filter 230R, and the overcoat 188.

A pixel electrode 191 and a reference voltage line 196 are disposed (or placed) on the overcoat 188. The pixel electrode 191 and the reference voltage line 196 are spaced apart from each other. The pixel electrode 191 and the reference voltage line 196 may include the same material.

The pixel electrode 191 includes a first sub-pixel electrode 191a and a second sub-pixel electrode 191b that are separated from each other with the gate line 121 therebetween in a plan view and that are adjacent to each other in a column (or vertical) direction based on the gate line 121. The reference voltage line 196 provides a set or predetermined voltage (such as a reference voltage), is disposed between the first sub-pixel electrode 191a and the second sub-pixel electrode 191b in a plan view, and is spaced apart from the first sub-pixel electrode 191a and the second sub-pixel electrode 191b (see FIG. 4). The reference voltage line 196 includes a connecting member 197 for connection with the reference electrode contact portion 137.

The first sub-pixel electrode 191a and the second sub-pixel electrode 191b have a rectangular shape as a whole, and include a cross-shaped stem portion including horizontal stem portions 192a and 192b and vertical stem portions 193a and 193b crossing the horizontal stem portions. The first sub-pixel electrode 191a and the second sub-pixel electrode 191b are respectively divided into four sub-regions by the horizontal stem portions 192a and 192b and the vertical stem portions 193a and 193b, and each of the sub-regions includes a plurality of minute branches 194a and 194b.

More specifically, one of the minute branches 194a and 194b of the first sub-pixel electrode 191a and the second sub-pixel electrode 191b is disposed to obliquely extend from the horizontal stems 192a and 192b or the vertical stems 193a and 193b in an upper left direction, and another minute branch is disposed to obliquely extend from the horizontal stems 192a and 192b or the vertical stems 193a and 193*b* in an upper right direction. Further, another minute branch is disposed to obliquely extend from the horizontal stems 192*a* and 192*b* or the vertical stems 193*a* and 193*b* in a lower left direction, and the other minute branch is disposed to obliquely extend from the horizontal stems 192*a* and 192*b* or the vertical stems 193*a* and 193*b* in a lower right direction.

Each of the minute branches 194*a* and 194*b* forms an angle of approximately (or about) 40 degrees to 45 degrees with the gate line 121 or the horizontal stems 192*a* and 192*b*. Particularly, the minute branch 194*a* included in the first sub-pixel electrode 191*a* may form an angle of approximately 40 degrees with the horizontal stem 192*a*, and the minute branch 194*b* included in the second sub-pixel electrode 191*b* may form an angle of approximately 45 degrees with the horizontal stem 192*b*. Further, the minute branches 194*a* and 194*b* of two adjacent subregions may cross (or be approximately perpendicular to) each other.

The first sub-pixel electrode 191*a* and the second sub-pixel electrode 191*b* include, respectively, a widened extension 195*a* and a widened extension 195*b*. The extension 195*a* of the first sub-pixel electrode 191*a* is physically and electrically connected to the first drain electrode 175*a* through the first contact hole 185*a*. Accordingly, the first sub-pixel electrode 191*a* receives a data voltage from the first drain electrode 175*a*. The extension 195*b* of the second sub-pixel electrode 191*b* and the second drain electrode 175*b* are physically and electrically connected to each other through the second contact hole 185*b*. Accordingly, the second sub-pixel electrode 191*b* receives a data voltage from the second drain electrode 175*b*.

The connecting member 197 electrically connects the reference electrode contact portion 137 and the third drain electrode 175*c* through the reference voltage contact hole 185*c*.

A portion of the data voltage applied to the second drain electrode 175*b* is divided or diverted through the third source electrode 173*c* such that a voltage applied to the first sub-pixel electrode 191*a* is larger (or higher in voltage level) than a voltage applied to the second sub-pixel electrode 191*b*. In this case, the voltages applied to the first sub-pixel electrode 191*a* and the second sub-pixel electrode 191*b* are positive (+). In contrast, when the voltages applied to the first sub-pixel electrode 191*a* and the second sub-pixel electrode 191*b* are negative (−), the voltage applied to the first sub-pixel electrode 191*a* is smaller (or lower in voltage level) than the voltage applied to the second sub-pixel electrode 191*b*.

In a related art case, the reference voltage line is formed in the same layer as the gate line, thus the data line overlaps the reference voltage line. Thus, when the data voltage is applied to the data line, a linear semiconductor near the data line among the linear semiconductors disposed between the data line and the reference voltage line becomes conductive. That is, the effect of thickening the data line occurs, thus capacitance between the data line and the reference voltage line increases, thereby resulting in a horizontal crosstalk defect of the pixel.

However, in the present embodiment, the reference electrodes 131 of pixels adjacent to each other based on the data line 171 are connected by the connecting member 197 included in the reference voltage line 196. Therefore, the data line 171 does not overlap the reference electrode 131. That is, when the data voltage is applied to the data line 171, the conductivity of the linear semiconductor 151 disposed at a lower portion of the data line 171 does not occur, and the horizontal crosstalk of the pixel is prevented from occurring.

A lower alignment film may be disposed on the overcoat 188, the pixel electrode 191, and the reference voltage line 196.

Hereinafter, the second display panel 200 will be described.

A light blocking member 220 is disposed on one surface of a second substrate 210 made of transparent glass and/or plastic.

The light blocking member 220 may extend along the data line 171 and the gate line 121. A width of the light blocking member 220 may be wider than that of the data line 171 and that of the gate line 121. As described above, the width of the light blocking member 220 is formed to be wider than the width of the data line 171, so that the light blocking member 220 may block or prevent light incident from the outside from being reflected from a surface of the metal data line 171. Accordingly, the light reflected from the surface of the data line 171 interferes with light passing through the liquid crystal layer 3, thereby protecting or preventing a contrast ratio of the liquid crystal display from being decreased.

A planarization film 250 is disposed on one surface of the light blocking member 220, and a common electrode 270 is disposed on one surface of the planarization film 250.

An upper alignment layer may be disposed on one side of the common electrode 270.

The liquid crystal layer 3 includes liquid crystal molecules having negative dielectric anisotropy, and the liquid crystal molecules may be aligned so that long axes thereof are normal or perpendicular with respect to the surfaces of the two display panels 100 and 200 in a state in which there is no electric field.

The first sub-pixel electrode 191*a* and the second sub-pixel electrode 191*b* to which the data voltage is applied generate an electric field along with the common electrode 270 of the second display panel 200, thereby determining alignment of liquid crystal molecules of the liquid crystal layer 3 between the first and second display panels 100 and 200. The luminance of light passing through the liquid crystal layer 3 along the alignment direction of the liquid crystal molecules determined as described above is thusly changed.

The display and/or any other relevant devices or components according to embodiments of the present invention described herein may be implemented utilizing any suitable hardware, firmware (e.g., an application-specific integrated circuit), software, or a combination of software, firmware, and hardware. For example, the various components of the display may be formed on one integrated circuit (IC) chip or on separate IC chips. Further, the various components of the display may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A liquid crystal display comprising:
a first substrate;
a gate line and a reference electrode that are on the first substrate and are spaced apart from each other;
a gate insulating film on the gate line and the reference electrode;
a semiconductor on the gate insulating film;
a data conductor on the semiconductor;
a passivation film on the data conductor;
a color filter on the passivation film;
an overcoat on the color filter; and
a pixel electrode and a reference voltage line that are at the same layer over the overcoat and are spaced apart from each other,
wherein:
the pixel electrode and the reference voltage line comprise the same material,
the reference voltage line is connected to the reference electrode through a reference voltage contact hole in the gate insulating film, the passivation film, the color filter, and the overcoat, and
the data conductor comprises a drain electrode connected to the reference electrode via the reference voltage line at the reference voltage contact hole.

2. The liquid crystal display of claim 1, wherein:
the gate line comprises a first gate electrode, a second gate electrode, and a third gate electrode,
the semiconductor comprises a linear semiconductor, a first channel portion, a second channel portion, and a third channel portion,
the data conductor comprises a data line, a first source electrode, a second source electrode, a third source electrode, a first drain electrode, and a second drain electrode, and a third drain electrode,
the pixel electrode comprises a first sub-pixel electrode and a second sub-pixel electrode that are spaced apart from each other, and
the third drain electrode is the drain electrode connected to the reference electrode via the reference voltage line at the reference voltage contact hole.

3. The liquid crystal display of claim 2, wherein:
the first channel portion overlaps the first gate electrode,
the second channel portion overlaps the second gate electrode, and
the third channel portion overlaps the third gate electrode.

4. The liquid crystal display of claim 3, wherein:
the data line is on the linear semiconductor,
the first source electrode and the first drain electrode are on the first channel portion and face each other based on the first gate electrode,
the second source electrode and the second drain electrode are on the second channel portion and face each other based on the second gate electrode, and
the third source electrode and the third drain electrode are on the third channel portion and face each other based on the third gate electrode.

5. The liquid crystal display of claim 4, wherein:
the first source electrode and the second source electrode are connected to each other, and
the third source electrode and the second drain electrode are connected to each other.

6. The liquid crystal display of claim 5, wherein:
the first source electrode and the second source electrode extend from the data line.

7. The liquid crystal display of claim 6, wherein:
the first sub-pixel electrode is connected to the first drain electrode through a first contact hole in the passivation film, the color filter, and the overcoat, and
the second sub-pixel electrode is connected to a second drain electrode through a second contact hole in the passivation film, the color filter, and the overcoat.

8. The liquid crystal display of claim 7, wherein:
the reference voltage line is between the first sub-pixel electrode and the second sub-pixel electrode in a plan view.

9. The liquid crystal display of claim 8, wherein:
the reference voltage line comprises a connecting member connected to the reference electrode through the reference voltage contact hole.

10. The liquid crystal display of claim 9, wherein:
the connecting member is connected to the third drain electrode through the reference voltage contact hole.

11. The liquid crystal display of claim 10, wherein:
the reference electrode comprises a first reference electrode, a second reference electrode, a third reference electrode, a fourth reference electrode, a fifth reference electrode, and a reference electrode contact portion,
the first reference electrode, the second reference electrode, and the third reference electrode surround the first sub-pixel electrode in a plan view,
the fourth reference electrode and the fifth reference electrode surround the second sub-pixel electrode in a plan view, and
the reference electrode contact portion extends from the first reference electrode.

12. The liquid crystal display of claim 11, wherein:
the connecting member is connected to the reference electrode contact portion through the reference voltage contact hole.

13. A liquid crystal display comprising:
a first substrate;
a gate line and a data line that are on the first substrate and are insulated from each other;
a reference electrode that is on the same layer as the gate line;
a first transistor and a second transistor that are connected to the gate line and the data line;
a third transistor connected to a drain electrode of the second transistor;
an insulating film on the first transistor, the second transistor, and the third transistor; and
a pixel electrode and a reference voltage line that are at the same layer over the insulating film and are spaced apart from each other,
wherein:
the pixel electrode and the reference voltage line comprise the same material,
the reference voltage line is connected to a drain electrode of the third transistor and the reference electrode through a reference voltage contact hole, and
the pixel electrode and the reference voltage line are at the same layer over the drain electrode of the third transistor.

14. The liquid crystal display of claim 13, wherein:
the pixel electrode comprises a first sub-pixel electrode and a second sub-pixel electrode that are spaced apart from each other.

15. The liquid crystal display of claim 14, wherein:
the first sub-pixel electrode is connected to a drain electrode of the first transistor, and
the second sub-pixel electrode is connected to a drain electrode of the second transistor.

16. The liquid crystal display of claim 15, wherein:
the reference voltage line is between the first sub-pixel electrode and the second sub-pixel electrode in a plan view.

17. The liquid crystal display of claim 16, wherein:
the reference voltage line comprises a connecting member connected to the drain electrode of the third transistor.

18. The liquid crystal display of claim 17,
wherein the reference electrode is separated from the gate line, and is connected to the connecting member.

19. The liquid crystal display of claim 18, wherein:
the reference electrode comprises a first reference electrode, a second reference electrode, a third reference electrode, a fourth reference electrode, a fifth reference electrode, and a reference electrode contact portion,
the first reference electrode, the second reference electrode, and the third reference electrode surround the first sub-pixel electrode in a plan view,
the fourth reference electrode and the fifth reference electrode surround the second sub-pixel electrode in a plan view, and
the reference electrode contact portion extends from the first reference electrode.

20. The liquid crystal display of claim 19, wherein:
the connecting member is connected to the reference electrode contact portion.

* * * * *